UNITED STATES PATENT OFFICE.

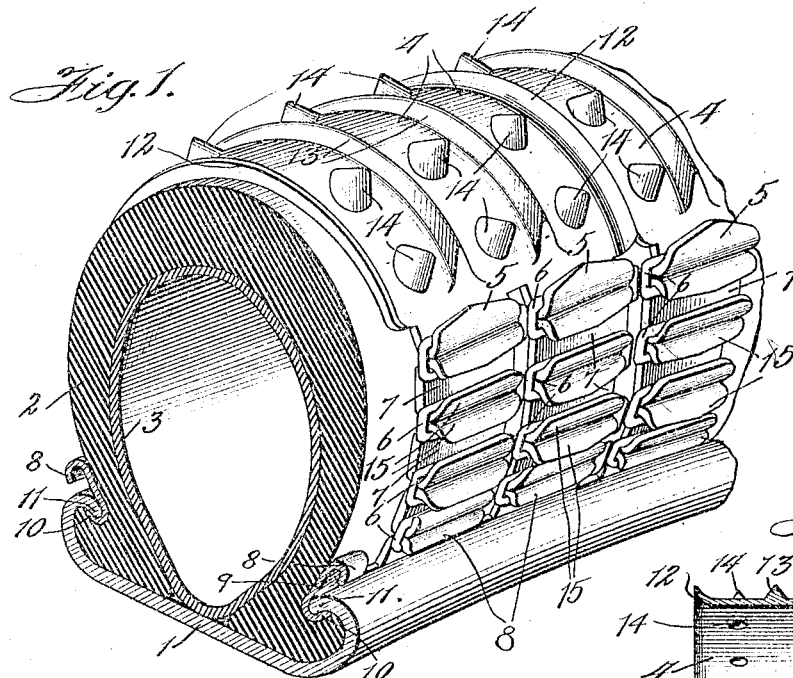

FRANK H. DAVIS, OF CHICAGO, ILLINOIS.

TIRE-PROTECTOR.

No. 926,104.  Specification of Letters Patent.  Patented June 29, 1909.

Application filed December 2, 1907. Serial No. 404,803.

*To all whom it may concern:*

Be it known that I, FRANK H. DAVIS, a citizen of the United States, residing at Chicago, in the county of Cook and State of Illinois, have invented new and useful Improvements in Tire-Protectors, of which the following is a full, clear, concise, and exact description, reference being had to the accompanying drawing, forming a part of this specification.

My invention relates to tire-protectors such as are used on pneumatic or other resilient tires, and has special reference to improvements in that class of tire-protectors by the use of which the tire is inclosed within a metallic shield or armor having sufficient flexibility to permit the tire to yield without hindrance to pressure to the extent required in service.

The other objects of the invention are: to provide a tire-protector of the above outlined type having improved means for removing the strain from the rubber or other material of which the tires are composed, thereby preventing bursting of the tires at the rim or elsewhere; to prevent the tire coming in contact with the street, and thereby wearing off its outer surface; to furnish a solid, metallic armor covering at point of contact with the street, thereby preventing injury to the rubber such as puncturing, cutting, stone-bruises and the like; to provide a surface of metal covering in contact with the street of such shape as to prevent skidding or slipping, and give better traction; and to provide means for securely attaching the armor in place without injury to the tire.

Another object of the invention is to provide improved means for securing the tread-plates in place, by the use of which these plates are securely held without chafing or otherwise injuring the tire.

I have shown a tire-protector embodying the features of my invention in the accompanying drawings, in which—

Figure 1 is a perspective view of a portion of the rim of a wheel, with a tire mounted thereon and provided with my improved tire-protector; Fig. 2 is a cross-sectional view of the same; and Fig. 3 is a longitudinal sectional view of the tread-plate taken on the line 3—3 of Fig. 2.

In these drawings, 1 is the rim of the wheel, around which extends the tire, shown herein as of the inflatable type, 2 being the casing and 3 being the inner tube thereof. Arranged consecutively around the outside of the tire, and preferably slightly spaced apart, is a series of tread-plates 4, each of which consists of a metallic member curved transversely to the tire and extending partly around the same. Each of these plates has a pair of hook members 5 formed integral therewith on each side of the tire, and to each of these hooks is secured a chain consisting of interlocking rings 6 and plates 7. The opposite end of each chain is engaged over a suitable hook 8 formed on a curved retaining strip 9 extending around the wheel. This strip 9 is formed with an outturned edge 10 which hooks under the inturned edge 11 of the rim of the wheel.

Heretofore, as devices of this type have been constructed, the tread plates, as well as the chains or other means employed for securing the tread plates in position, have usually been of such form as to present upon their inner surfaces corners or edges which chafed, wore and cut the tire. In the form of tread-plate which I employ, as well as in the form of chain which I use to secure the tread-plate in place, this difficulty is not present. The tread-plates 4 are formed with their adjacent edges 12 turned outwardly or away from the tire, this construction resulting in the elimination of sharp edges extending across the tire, which would, if present, be destructive of the material of which resilient tires are made. These outturned edges add materially to the tractive effect of the plates upon the roadway. To further increase the tractive effect I form upon the plates transverse ribs 13. To prevent lateral slipping or skidding I have brought up the metal in hollow pyramids 14 that not only are effective when new and sharp, but as the points wear down form "craters," or sharp ring edges of projected metal that are equally effective for this purpose.

The form of chain which I employ consists, as hereinbefore stated, of interlocked rings 6 and plates 7. These rings are rectangular in form and alternate with the plates 7, each of the latter having its ends 15 hooked and passed outwardly through the adjacent ring, these ends being then bent over toward each other, as clearly shown in the figures of the drawings. This construction eliminates all corners or edges likely to effect injury to the material of the tire. The end links of the chains are rings, one of which is passed on to one of the hooks 5 of a tread-plate, the other being secured to one of the hooks 8 of the strip 9. This form of chain affords a securing means which is adapted to permit the tread-plates to move toward and away from the rim of the wheel, as required when the wheel is running, and yet one which permits ready attachment or detachment of the protector.

In devices of this class it has been found difficult to overcome the tendency of the parts to creep around the wheel when the latter is running, thereby wearing the attaching chain unevenly to one side or twisting it off altogether. I overcome this difficulty by means of the suction air chambers within the pyramids 14. These air chambers extend outward from the inner side of the tread-plates, or the surface of the tread-plate that comes next the tire. By the pressure of the heavy car the air is expelled from these chambers and the rubber is forced into the chambers. Atmospheric pressure thus holds the armor plate to the rubber tire with absolute security, and it also forces up knots of rubber into the chambers that prevent the slipping of the armor on the tire under the influence of the applied force of the engine of the car in its tractive effort. The tread-plates being each held in place by two or more chains, rocking of the plates is prevented. These plates are elongated so as to be substantially or nearly in engagement with each other; this feature also preventing rocking of the plates.

Having thus described my invention, what I claim as new and desire to secure by Letters Patent, is:

1. The combination with a wheel rim and tire, of a tire armor comprising a plurality of tread-plates, a pair of continuous retaining members arranged to be interposed between the tire and the rim, each having an outturned portion arranged to engage under the bead of the rim and a plurality of outturned hooks arranged to project above the rim, and flexible means for connecting said tread-plates with said hooks.

2. The combination with a wheel rim and tire, of a series of tread-plates arranged upon the periphery of the tire, and means for yieldably connecting said tread plate with said rim, said means comprising a chain composed of alternating rings and plates, each of said plates having its opposite ends bent away from the tire and through the adjacent ring.

3. The combination of a tire and wheel rim, a series of tread-plates arranged upon the periphery of the tire, and flexible means for holding said tread-plates to the rim, said means consisting of a chain comprising interlinked plates and rings, said plates having their ends bent away from the tire to form hooks interlinked with the adjacent rings.

4. The combination with a wheel rim and tire, of a series of tread-plates arranged upon a periphery of the tire, a pair of continuous retaining members arranged to be interposed between the tire and the rim, each having an outturned continuous flange arranged to engage under the bead of the rim and a plurality of outturned hooks arranged exteriorly of said rim, and means for yieldingly connecting the tread-plates with the hooks of said retaining members comprising a chain composed of alternating rings and plates, each of said plates having its opposite ends bent away from the tire and through the adjacent ring.

In witness whereof, I have hereunto subscribed my name in the presence of two witnesses.

FRANK H. DAVIS.

Witnesses:
 I. N. L. HARRAR,
 C. L. HOPKINS.